(12) United States Patent
LaCroix

(10) Patent No.: US 9,133,967 B2
(45) Date of Patent: Sep. 15, 2015

(54) ROTARY UNION WITH PRESSURE CONTROLLED SEAL ACTUATOR

(71) Applicant: Deublin Company, Waukegan, IL (US)

(72) Inventor: Aaron LaCroix, Antioch, IL (US)

(73) Assignee: Deublin Company, Waukegan, IL (US)

( * ) Notice: Subject to any disclaimer, the term of this patent is extended or adjusted under 35 U.S.C. 154(b) by 117 days.

(21) Appl. No.: 13/957,111

(22) Filed: Aug. 1, 2013

(65) Prior Publication Data

US 2014/0035274 A1 Feb. 6, 2014

Related U.S. Application Data

(60) Provisional application No. 61/679,343, filed on Aug. 3, 2012.

(51) Int. Cl.
*F16L 17/00* (2006.01)
*F16L 27/08* (2006.01)
*F16L 17/10* (2006.01)

(52) U.S. Cl.
CPC ............... *F16L 17/00* (2013.01); *F16L 17/10* (2013.01); *F16L 27/082* (2013.01)

(58) Field of Classification Search
CPC .................................. F16L 17/00; F16L 17/06
USPC ................................. 137/580; 285/101–103
See application file for complete search history.

(56) References Cited

U.S. PATENT DOCUMENTS

| | | | | |
|---|---|---|---|---|
| 3,455,566 A | * | 7/1969 | Hull et al. | 277/582 |
| 4,976,282 A | * | 12/1990 | Kubala | 137/580 |
| 5,052,436 A | * | 10/1991 | Bauch et al. | 137/580 |
| 5,240,039 A | * | 8/1993 | Colussi et al. | 137/580 |
| 5,533,762 A | * | 7/1996 | Carmona | 285/101 |
| 6,029,695 A | * | 2/2000 | Logan | 137/580 |
| 6,308,734 B1 | * | 10/2001 | Smith et al. | 137/580 |
| 6,406,065 B1 | * | 6/2002 | Ott et al. | 285/120.1 |
| 6,517,077 B1 | * | 2/2003 | Enomura | 277/358 |
| 6,572,154 B1 | * | 6/2003 | Niemiec | 285/305 |
| 7,229,102 B2 | * | 6/2007 | Kubala | 285/98 |
| 7,422,031 B2 | * | 9/2008 | Benson et al. | 137/580 |
| 7,815,224 B2 | * | 10/2010 | Ford et al. | 285/95 |
| 8,453,675 B2 | * | 6/2013 | Burrus et al. | 137/580 |
| 8,714,598 B2 | * | 5/2014 | Bohner et al. | 285/98 |
| 2004/0119280 A1 | * | 6/2004 | Kubala | 285/101 |
| 2007/0034265 A1 | * | 2/2007 | Mohr et al. | 137/580 |
| 2011/0126909 A1 | * | 6/2011 | Burrus et al. | 137/1 |

FOREIGN PATENT DOCUMENTS

EP 2 330 327 A1 6/2011

OTHER PUBLICATIONS

European Patent Application No. 13179166.7 Search Report (Dec. 12, 2013).

* cited by examiner

*Primary Examiner* — Craig Schneider
*Assistant Examiner* — Daniel Donegan
(74) *Attorney, Agent, or Firm* — Leydig, Voit & Mayer, Ltd.

(57) ABSTRACT

A rotary union includes a rotating seal carrier having a rotating seal member connected thereon, and a non-rotating seal carrier having a non-rotating seal member connected thereon. A piston portion of the non-rotating seal carrier has a flow restrictor ring disposed thereon, and both are slidably and sealably disposed within a piston bore formed in a housing. A gap is formed between an outer diameter of the flow restrictor ring and an inner diameter of the piston bore. The enlarged diameter of the piston portion provides a net pneumatic or hydraulic surface that can be acted upon by a fluid at a positive or negative atmospheric pressure present within the piston bore of the housing.

17 Claims, 5 Drawing Sheets

ROTARY UNION WITH PRESSURE CONTROLLED SEAL ACTUATOR

CROSS-REFERENCE TO RELATED APPLICATIONS

This patent application claims the benefit of U.S. Provisional Patent Application No. 61/679,343, filed on Aug. 3, 2012, which is incorporated herein in its entirety by this reference.

TECHNICAL FIELD OF THE DISCLOSURE

The present invention relates to fluid coupling devices such as rotary unions and, more particularly, to an improved seal control actuator mechanism that operates with fluid pressure regardless of the use of lubricating media, non-lubricating media, or no media within the rotary union.

BACKGROUND OF THE INVENTION

Fluid coupling devices such as rotary unions are used in industrial applications, for example, machining of metals or plastics, work holding, printing, plastic film manufacture, papermaking, semiconductor wafer manufacture, and other industrial processes that require a fluid medium to be transferred from a stationary source such as a pump or reservoir into a rotating element such as a machine tool spindle, work-piece clamping system, or rotating drums or cylinder. Often these applications require relatively high media pressures, flow rates, or high machine tool rotational speeds.

Rotary unions used in such applications convey fluid medium used by the equipment for cooling, heating, or for actuating one or more rotating elements. Typical fluid media include water-based liquids, hydraulic or cooling oils, and air. In certain instances, for example, when evacuating media from a fluid passage, rotary unions may operate under vacuum. Machines using rotary unions typically include precision components, such as bearings, gears, electrical components, and others, that are expensive and/or difficult to repair or replace during service. These components are often subject to corrosive environments or to damage if exposed to fluid leaking or venting from the rotary union during operation.

A rotary union typically includes a stationary member, sometimes referred to as the housing, which has an inlet port for receiving fluid medium. A non-rotating seal member is mounted within the housing. A rotating member, which is sometimes referred to as a rotor, includes a rotating seal member and an outlet port for delivering fluid to a rotating component. A seal surface of the non-rotating seal member is biased into fluid-tight engagement with the seal surface of the rotating seal member, generally by a spring, media pressure, or other method, thus enabling a seal to be formed between the rotating and non-rotating components of the union. The seal permits transfer of fluid medium through the union without significant leakage between the non-rotating and rotating portions. Fluid medium passing through the rotary union may lubricate the engaged seal surfaces to minimize wear of the seal members. When a rotary union is used with non-lubricating media (such as dry air) or without any media, the engaged seal surfaces can experience a "dry running" condition, which causes rapid seal wear due to lack of adequate lubrication. Extended periods of dry running can cause severe damage to the seal members, thereby requiring expensive and time-consuming replacement of one or both seal members.

High-speed machining equipment, such as computer-numerical-control (CNC) milling machines, drilling machines, turning machines, transfer lines, and so forth, use rotary unions to supply a medium directly to the cutting edge of a tool for cooling and lubrication in an arrangement that is commonly referred to as "through spindle coolant." A through spindle coolant arrangement extends the service life of costly cutting tools, increases productivity by allowing higher cutting speeds, and flushes material chips that can damage the work-piece or cutting tool away from the cutting surfaces of the tool. Different work-piece materials typically require different media for optimal productivity and performance. For example, air or aerosol media may provide better thermal control when machining very hard materials, while liquid coolants may offer better performance when machining softer materials, such as aluminum. In addition, certain kinds of work may be performed more effectively and less expensively without a through-spindle medium.

In certain applications, it may also be desired to avoid any spillage of the working fluid of the coupling when the seal is disengaged, for example, when changing tool spindles. Along these same lines, it may further be desired to engage the rotary seal of the coupling before the working fluid is at full pressure so that the initiation of flow, which flow may include a mixture of the working fluid with air, does not cause leakage of the working fluid.

SUMMARY OF THE DISCLOSURE

In one aspect, the disclosure describes a rotary union for providing a fluid connection between a rotating machine component and a non-rotating machine component. The rotary union includes a rotating seal carrier adapted for connection to the rotating machine component. The rotating seal carrier has a rotating seal member connected thereon. A non-rotating seal carrier having a generally cylindrical shape has a non-rotating seal member connected thereon. A piston portion is connected to an end of the non-rotating seal carrier proximate the non-rotating seal member. The piston portion has a generally cylindrical shape with an enlarged diameter relative to the non-rotating seal carrier. A flow restrictor ring has a generally annular shape and is disposed around the piston portion. A housing is connected to the non-rotating machine component and forms a carrier bore into which the non-rotating seal carrier is slidably and sealably disposed. When the non-rotating seal carrier is at an extended position relative to the housing, the non-rotating seal engages the rotating seal to form a sliding face seal. The housing further forms a piston bore that slidably accepts therewithin the piston portion and the flow restrictor ring such that a gap is formed in a radial direction between an outer diameter of the flow restrictor ring and an inner diameter of the piston bore. A segmented media channel is formed in the rotating and non-rotating seal carriers. The segmented media channel is adapted to define a fluid passageway that conveys fluid media between the rotating and non-rotating machine components while the sliding face seal is present. The segmented media channel is further adapted to be open for venting to the atmosphere when the rotating and non-rotating seal members are not engaged. In one disclosed embodiment, the enlarged diameter of the piston portion provides a net pneumatic or hydraulic surface that can be acted upon by a fluid at a positive or negative atmospheric pressure present within the piston bore of the housing.

In another aspect, the disclosure describes a rotary union for use in a machine including rotating and non-rotating components. The rotary union is disposed to fluidly connect a segmented media channel extending between the non-rotating and the rotating machine components. The rotary union includes a rotating seal carrier that is connectable to the rotating machine component. The rotating seal carrier has a rotating seal member connected thereon. A non-rotating seal carrier is connectable to the non-rotating machine component and has a non-rotating seal member connected thereon. A piston portion is formed on an end of the non-rotating seal carrier proximate the non-rotating machine component. The piston portion has a generally cylindrical shape with an enlarged outer dimension relative to the non-rotating seal carrier. A housing forms a carrier bore into which the non-rotating seal carrier is slidably and sealably disposed such that, when the non-rotating seal carrier is at an extended position relative to the housing, the non-rotating seal engages the rotating seal to form a sliding face seal. The housing further forms a piston bore that slidably accepts therewithin the piston portion such that a gap is formed in a radial direction between an outer diameter of the flow piston portion and an inner diameter of the piston bore. A segmented media channel is formed in the rotating and non-rotating seal carriers. The segmented media channel is adapted to define a fluid passageway that conveys fluid media between the rotating and non-rotating machine components while the sliding face seal is present. The segmented media channel is further adapted to be open for venting to the atmosphere when the rotating and non-rotating seal members are not engaged. The enlarged outer dimension of the piston portion provides a net pneumatic or hydraulic surface that can be acted upon by a fluid at a positive or negative atmospheric pressure present within the piston bore of the housing.

In yet another aspect, the disclosure describes a machine having a rotating component and a non-rotating component. The rotating and non-rotating components form a segmented media channel through which fluid may be provided between the rotating and non-rotating components. The machine further includes a rotary union disposed to selectively create a fluid passageway along the segmented media channel. The rotary union comprises a rotating seal carrier that is connectable to the rotating machine component and that has a rotating seal member connected thereon. The rotary union further comprises a non-rotating seal carrier that is connectable to the non-rotating machine component and that has a non-rotating seal member connected thereon. A piston portion is formed on an end of the non-rotating seal carrier proximate the non-rotating machine component. The piston portion has a generally cylindrical shape with an enlarged outer dimension relative to the non-rotating seal carrier. A housing forms a carrier bore into which the non-rotating seal carrier is slidably and sealably disposed such that, when the non-rotating seal carrier is at an extended position relative to the housing, the non-rotating seal engages the rotating seal to form a sliding face seal. The housing further forms a piston bore that slidably accepts therewithin the piston portion such that a gap is formed in a radial direction between an outer diameter of the flow piston portion and an inner diameter of the piston bore. The segmented media channel defines the fluid passageway that conveys fluid media between the rotating and non-rotating machine components while the sliding face seal is present. The segmented media channel is open for venting to the atmosphere when the rotating and non-rotating seal members are not engaged. During operation, the enlarged outer dimension of the piston portion provides a net pneumatic or hydraulic surface that can be acted upon by a fluid at a positive or negative atmospheric pressure present within the piston bore of the housing.

DETAILED DESCRIPTION

Figure 1:
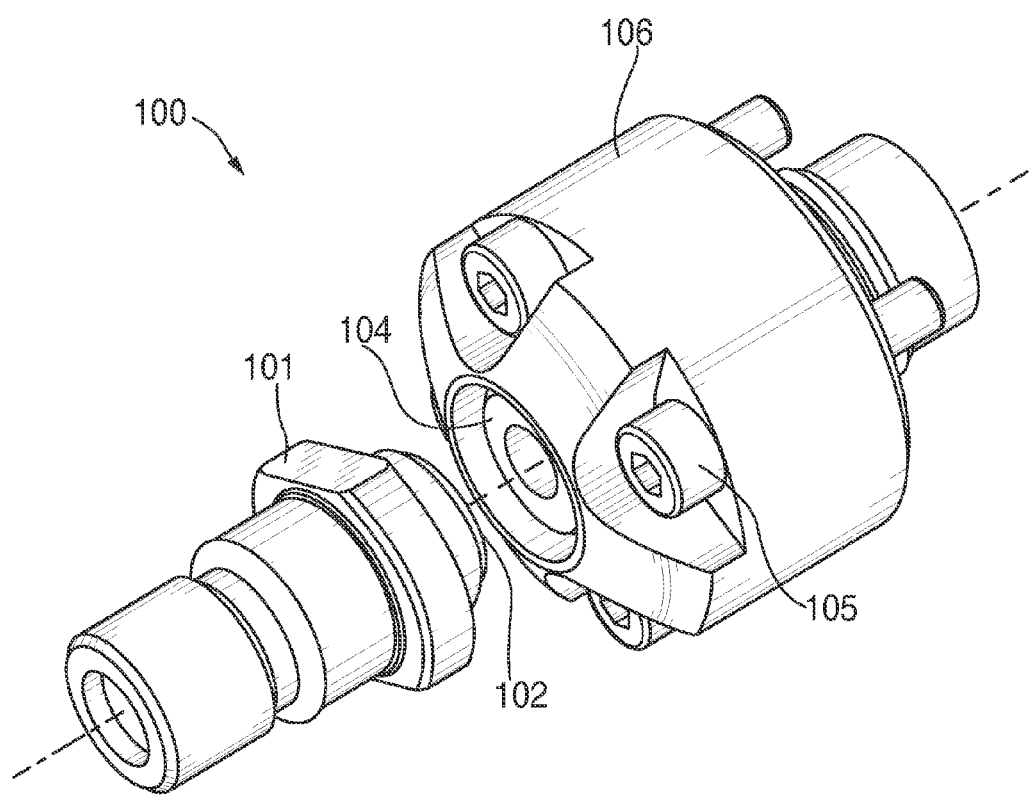
FIG. 1 is an outline view of a rotary union in accordance with the disclosure.
Figure 2:
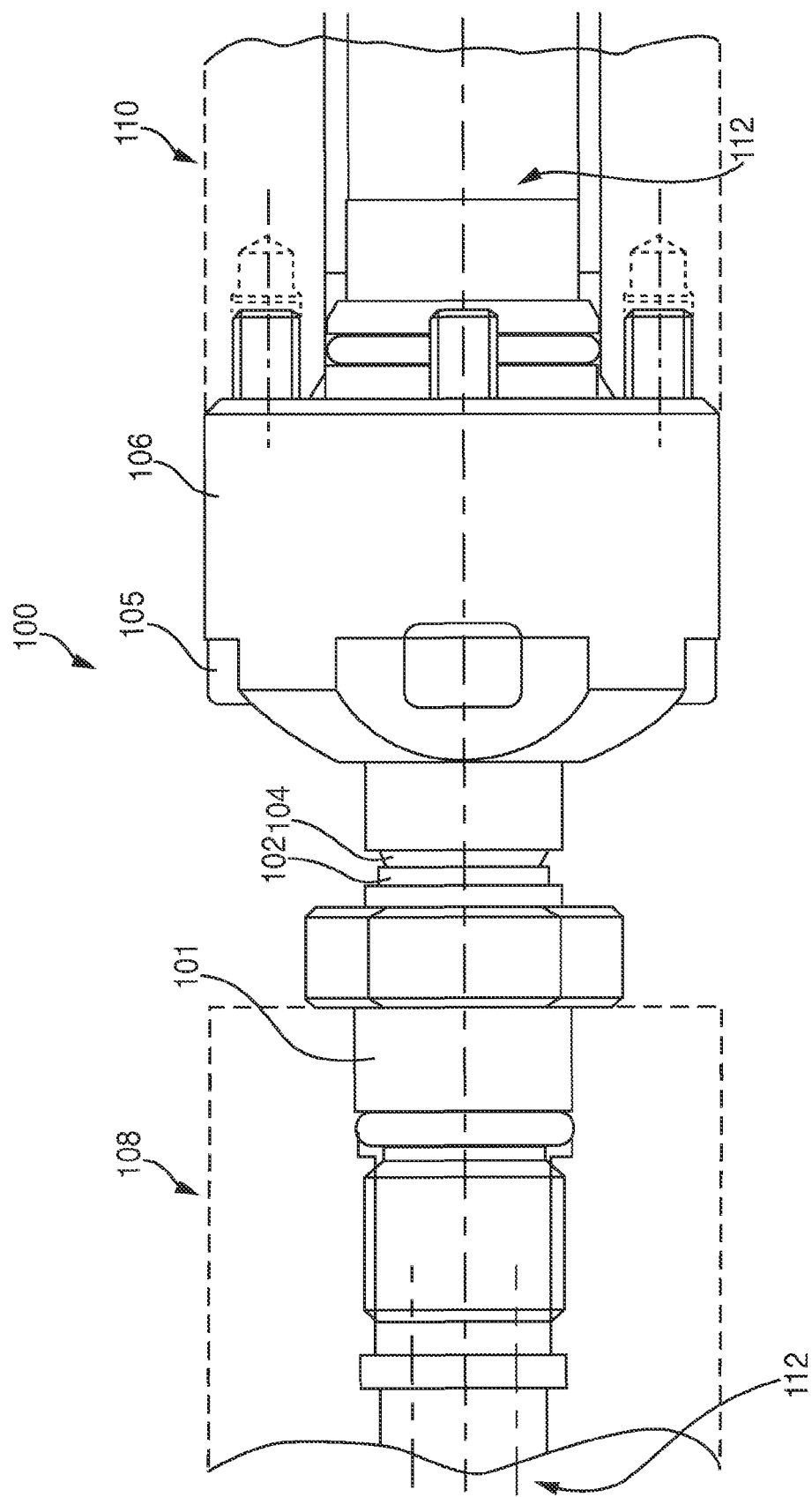
FIG. 2 is a side view of a rotary union installed between rotating and stationary machine components in accordance with the disclosure.
Figure 3:
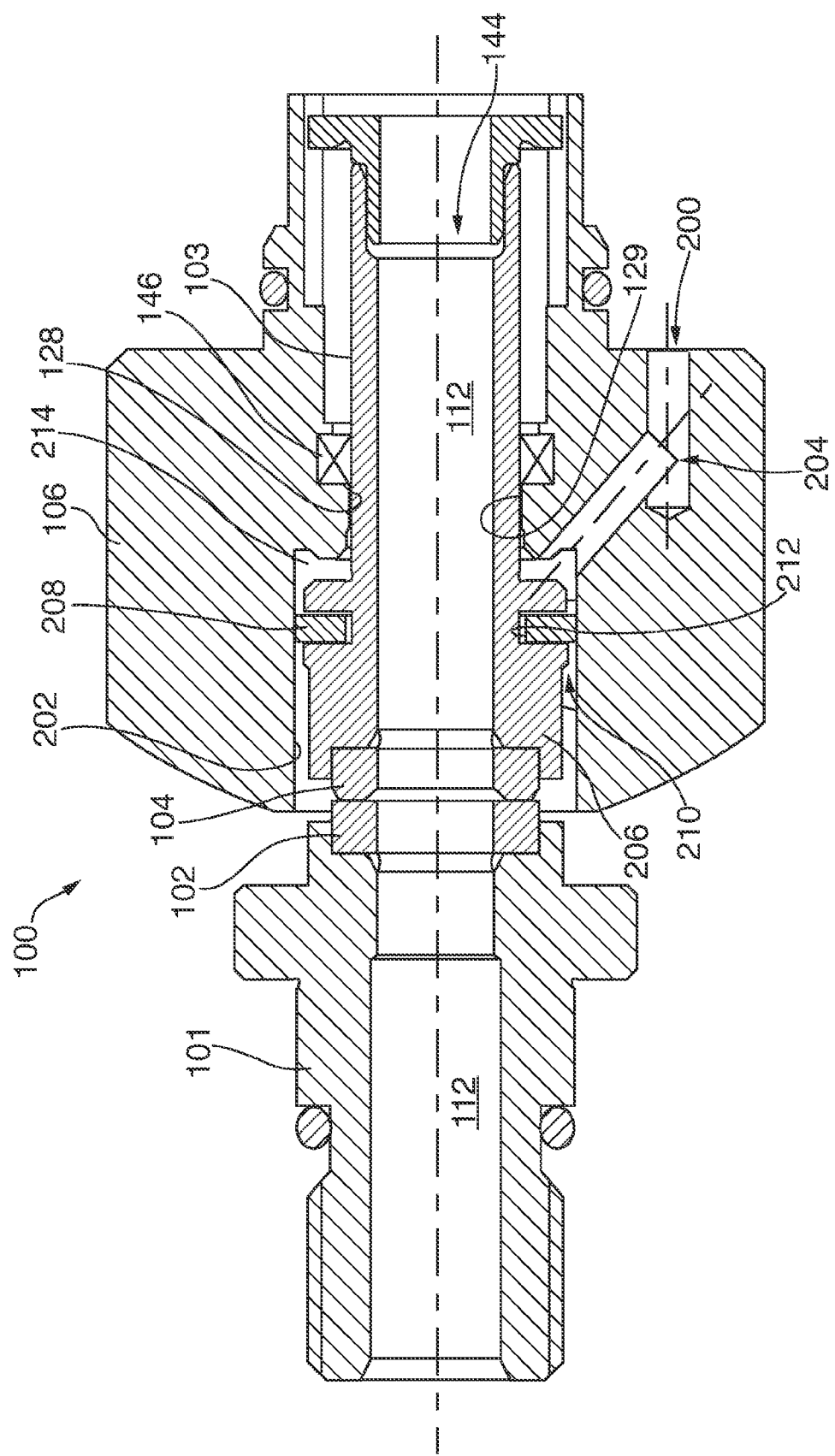
FIG. 3 is a cross section of one embodiment of a rotary union having an air-controlled seal engagement mechanism in accordance with the disclosure.

In the drawings, which form a part of this specification, FIG. 1 is an exploded isometric view of one embodiment of a rotary union 100, FIG. 2 is a side view of the rotary union 100 as installed between two machine components, which are shown in dashed lines and sectioned for illustration of the placement of the rotary union components therewithin and between, and FIG. 3 is a fragmented view of the rotary union 100. In reference to FIGS. 1, 2 and 3, the rotary union 100 includes a rotating seal member 102 connected to the end of a rotating seal carrier 101, which is commonly referred to as a rotor, and a non-rotating seal member 104 that is connected at the end of a non-rotating seal carrier 103 (shown in FIG. 3). The non-rotating seal carrier 103 is axially moveable relative to a housing 106. The rotating seal member 102 is associated with a rotating machine component 108 (FIG. 2), and the housing 106 is associated with a non-rotating machine component 110. A segmented conduit or media channel 112 extends through the non-rotating machine component 110, the rotating seal carrier 101 and the non-rotating seal carrier 103, the rotating and non-rotating seal members 102 and 104 respectively, and the rotating machine component 108 as is best illustrated in FIG. 2.

Portions of the media channel 112 are defined in different components of the rotary union 100 to provide a fluid passageway through the rotating and non-rotating machine components 108 and 110 when the rotating and non-rotating seal members 102 and 104 are engaged. The media channel 112 may be selectively arranged to sealingly enclose fluids when the rotating and non-rotating seal members 102 and 104 are engaged to one another, and be open for venting to the atmosphere when the rotating and non-rotating seal members 102 and 104 are not engaged, as is described in more detail relative to the operation of the rotary union 100 and the description that follows relative to the flowchart of FIG. 5, as described below. In certain applications, the media channel 112 may be subjected to a vacuum that pulls and evacuates working fluids from within the media channel 112.

The rotating machine component 108, which can be any type of machine component such as a spindle on a CNC milling machine, supports the rotating carrier 101 and the rotating seal member 102. A mechanical face seal created when the rotating seal member 102 is engaged with the non-rotating seal member 104 seals the media channel 112 for transferring a fluid medium from the non-rotating to the rotating machine components 110 to 108. In the illustrated embodiment, the housing 106 is connected to the non-rotating machine component 110 by bolts 105 (four shown) that engage corresponding threaded openings formed in the non-rotating machine component 110, but other mounting arrangements can be used. The rotating machine component 108 has a bore that defines a portion of the media channel 112 and further defines features for sealingly receiving the rotating seal carrier 101 and the rotating seal member 102.

One embodiment for the rotary union 100 is shown in the cross section of FIG. 3. In reference to FIG. 3, the non-rotating seal member 104 is connected to the non-rotating seal carrier 103. The non-rotating seal carrier 103 is slidably and sealably disposed within a bore 128 of the housing 106, and has an outer diameter portion that slidably engages a land 129 of the bore 128. As shown in FIG. 3, the bore 128 is generally stepped along various segments thereof such that the land 129 comes in sliding contact with the carrier 103 and forms a slight gap therebetween that allows for angular misalignment in an axial direction between the carrier 103 and the bore 128, which advantageously permits the rotary union to accommodate assembly and operational misalignment conditions between the rotating and non-rotating machine components 108 and 110 (FIG. 2). The axial length and inner diameter dimension of the land 129, which extends annularly around the non-rotating seal carrier 103, can be selected depending on the particular design requirements and expected misalignment between components for each application. The structural arrangement permitting sliding of the non-rotating seal member 104 relative to the non-rotating machine component 110 enables the selective engagement and disengagement of the non-rotating seal member 104 with the rotating seal member 102, and compensates for axial displacement that may be present between the rotating and the non-rotating machine components 108 and 110.

The housing 106 has passages and openings for provision of a working fluid to the media channel 112, which may be a liquid or a gas, and for provision of air or a vacuum to an activation channel, which causes the non-rotating seal carrier 103 to move relative to the housing 106. More specifically, the housing 106 forms an air actuation port 200, which is fluidly connected to a piston bore 202 formed in the housing 106. The piston bore 202 is part of, and coaxial with, the bore 128 that accommodates the non-rotating seal 104 and the non-rotating seal carrier 103. As can be seen in FIG. 3, the piston bore 202 has a large diameter relative to the remaining portions of the bore 128, and is disposed at the end of the bore 128 to form an open end thereof that faces the rotating seal member 102. An actuation air passage 204 extends through a portion of the housing 106 to fluidly interconnect the piston bore 202 with the actuation air port 200.

A portion of the non-rotating seal carrier 103 that is disposed within the piston bore 202 has an enlarged diameter relative to remaining portions thereof, which for simplicity will be referred to herein as the piston portion 206. The piston portion 206 is reciprocally disposed within the piston bore 202 when the non-rotating seal carrier 103 is disposed in the housing 106. The relatively enlarged diameter of the piston portion 206 provides a net pneumatic or hydraulic surface that can be acted upon by a vacuum or a fluid at a pressure present within the actuation air passage 204. The pressurized fluid or vacuum is generally contained adjacent such pneumatic or hydraulic surface by the aid of a flow restrictor ring 208.

The flow restrictor ring 208 controls the size and flow characteristics of a gap 210 that may be present between an outer diameter of the piston portion 206 and an inner diameter of the piston bore 202. In a fashion that is similar to the seals provided between a bore and a reciprocating piston in an internal combustion engine, the flow restrictor ring 208 is a generally annular-shaped seal that is disposed within a channel 212 formed annularly around the piston portion 206. The flow restrictor ring 208 may include a cross-cut opening to aid installation into the groove or channel 212, or may alternatively be continuous and installed using other arrangements.

The flow restrictor ring 208 may further possess some resilience such that a slight compression thereof may be required in a radially inward direction during installation into the piston bore 202. Alternatively, the flow restrictor ring 208 may be made to have an outer diameter that has a clearance fit within the piston bore 202. When installed, the flow restrictor ring 208 is configured to permit a small leakage of fluid, for example, air, into or out from a piston volume 214. In other words, a controlled leakage condition is created for fluids passing past the interface between the flow restrictor ring 208 and the piston bore 202 and/or the piston portion 206. The term piston volume 214 is used herein to describe that portion of the piston bore 202 that is fluidly in communication with the actuation air passage 204 and is defined between actuation air passage 204 and the flow restrictor ring 208. The piston volume 214 extends generally symmetrically around the piston bore 202 such that any pneumatic or hydraulic force applied to the piston portion 206 is advantageously symmetric relative to the non-rotating seal member 104.

A secondary seal 146 provides a sliding seal between the housing 106 and an outer surface of the non-rotating seal carrier 103. The secondary seal 146 in the illustrated embodiment is axially located between the piston volume 214 and an inlet 144 of the portion of the media channel 112 that extends through the non-rotating seal carrier 103. The secondary seal 146 can be embodied as any appropriate type of sliding seal, for example, a U-cup seal, O-ring seal, lip seal and the like. When pressurized media or a vacuum is present within the media channel 112, the secondary seal acts to seal the media channel 112 both from the environment as well as from the piston volume 214.

During operation, the application of a relatively low air pressure or a vacuum to the piston volume 214 will cause the non-rotating seal carrier 103 to extend or retract relative to the housing 106. In other words, notwithstanding any hydraulic forces acting on the non-rotating seal carrier 103 by the media and causing the same to axially move relative to the housing 106, an application of air pressure or vacuum to the piston volume 214 will have the effect of a pneumatic (or hydraulic, depending on the type of fluid used) linear piston actuator that will operate to extend or retract the carrier 103 relative to the bore 202 of the housing 106. Specifically, when an air flow is provided to the air actuation port 200, the flow momentum of that air will fill the piston volume 214 and, even though the airflow will leak at a controlled rate past the flow restrictor ring 208, will dynamically push against a back side of the piston portion 202 and/or the ring 208, thus causing the non-rotating seal carrier 103 to move in an extending direction relative to the housing 106. Similarly, when the air actuation port 200 is subjected to a vacuum, the flow momentum of a flow of air moving into the piston volume 214 in a controlled leakage fashion will push on ring 208 and thus impart a force tending to push the non-rotating seal carrier 103 in a retracting direction relative to the housing 106. Alternatively, axial motion of the rotor or rotating seal carrier 101 towards the housing 106 may cause retraction of the non-rotating seal carrier 103.

Regarding the flow restrictor ring 208, even though it is shown in FIG. 3 to have a rectangular cross section, other cross sections can be used. The ring 208 may be made of any suitable material. In one embodiment, the ring 208 is made of a material that is formable in desired dimensions, has a relatively low friction when interfacing with the walls of the piston bore 202, and is generally self-lubricating when air is used as the actuating fluid relative to the piston volume 214.

The independent provision of air or vacuum to the piston volume 214 advantageously enables the selective opening and closing of the rotating seal, i.e., the engagement or disengagement of the rotating and non-rotating seal members 102 and 104, regardless of the type, presence or absence of working media within the media channel 112. As is known, a balance ratio may be structurally defined relative to the non-rotating seal carrier 103 and seal 104, which can present a net hydraulic opening or closing equivalent surface relative to fluids present in the media channel 112. In this way, a pressurized fluid acting on this equivalent surface may impart a force tending to engage or disengage the rotating and non-rotating seal members 102 and 104. In the illustrated embodiment, the balance ratio of the structure shown is about 54%, but can range anywhere between 50 and 60%. With this balance ratio, the rotating seal can be engaged when incompressible media is present within the channel 112 at a pressure, or provide a gap between the rotating and non-rotating seal members when compressible media is present in the media channel 112, when no air flow or vacuum is provided to the air actuation port 200.

Figure 4:
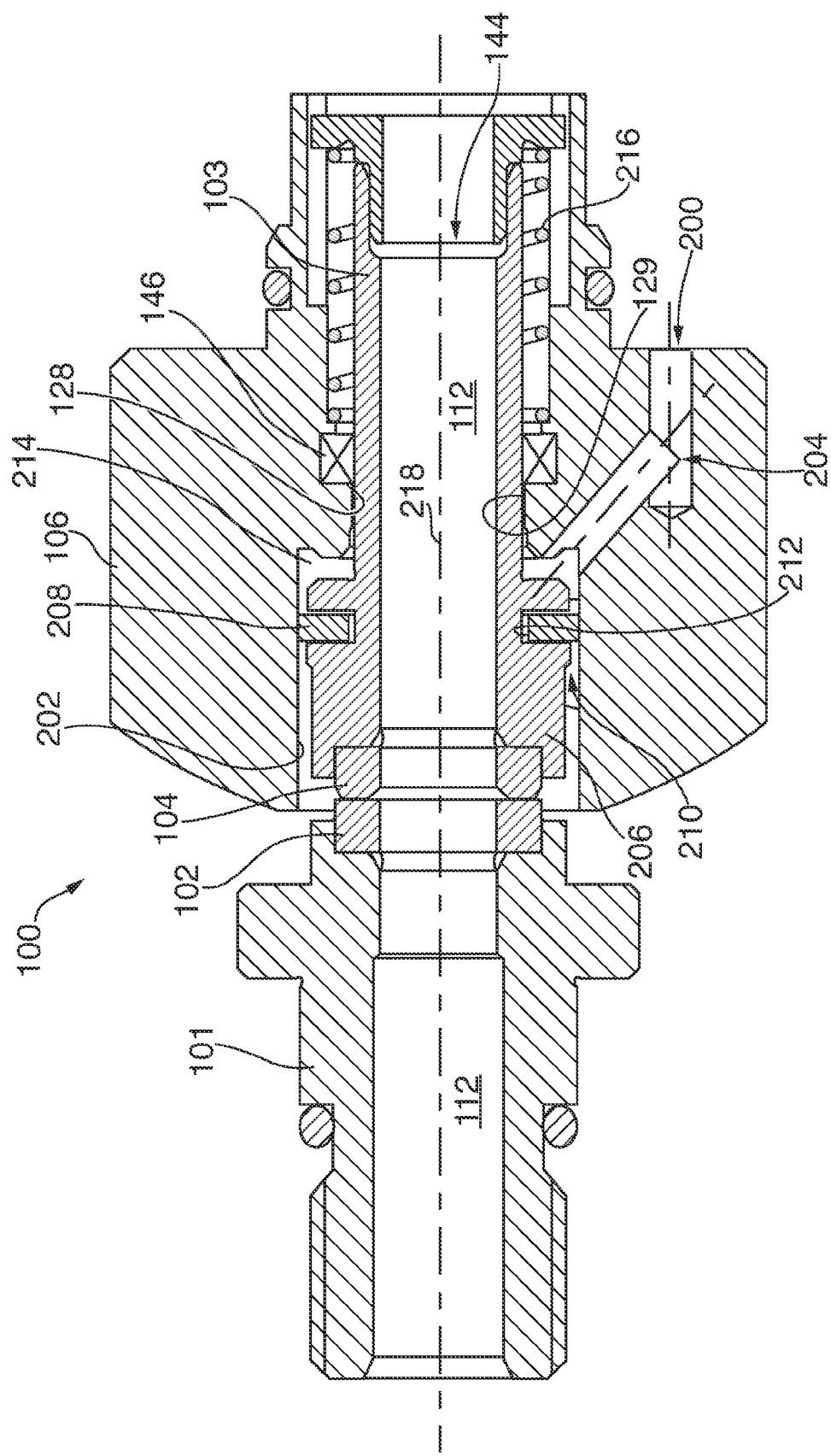
FIG. 4 is a cross section of another embodiment of a rotary union having an air-controlled seal engagement mechanism in accordance with the disclosure.

An alternative embodiment of the rotary union 100 is shown in FIG. 4. Here, like reference numerals denote like structures as previously described and shown, for example, in FIG. 3, for simplicity. In this embodiment, the rotary union 100 includes an opening spring 216. The opening spring 216 is disposed between the housing 106 and the non-rotating seal carrier 103 and is configured to provide a biasing force tending to push the non-rotating seal carrier 103 in a retracting axial direction relative to the housing. This embodiment may be suitable for applications in which the rotary union 100 is installed in a vertical or angled orientation, that is, in an orientation in which a centerline 218 of the non-rotating seal carrier 103 is not horizontal. In such applications, the spring force or spring constant of the spring 216 may be selected such that the force provided by the spring is sufficient to overcome the weight of the non-rotating seal carrier 103 and non-rotating seal member 104. As can be appreciated, depending on the installation orientation, the spring and housing 106 may be configured to provide a closing force instead of an opening force. Despite the presence and action of the spring 216, however, the balance ratio of the non-rotating seal carrier 103 and seal member 104 may advantageously remain unchanged between the embodiments shown and discussed relative to FIGS. 3 and 4.

Figure 5:
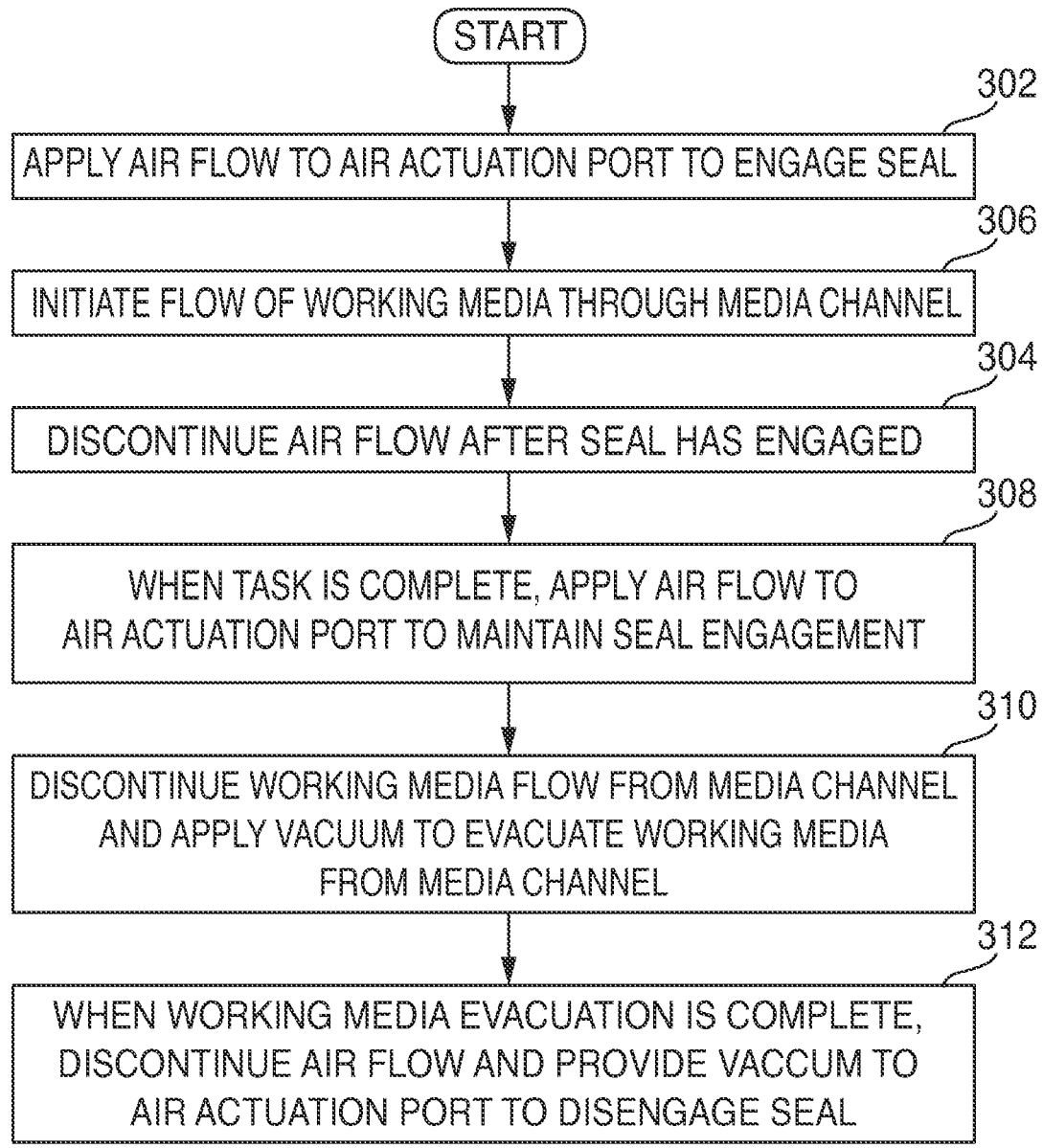
FIG. 5 is a flowchart for a method of operating a rotary union having an air-controlled seal engagement mechanism in accordance with the disclosure.

A flowchart for a method of operating the rotary union 100 is shown in FIG. 5. The described method is presented to illustrate one possible mode of operating the rotary union 100 and should not be understood to be exclusive of other operating modes or exhaustive of all possible operating modes. The described method includes desirable features for the operation of a rotary union, all or a subset of which may be used at different times during operation or in different applications depending on the particular requirements of each operating task.

The described method is applicable to the use of a rotary coupling in a machine tool, where undesirable operational characteristics may be present at the beginning and at the end of a work task. The work task contemplated may include a cycle of initiation, use, and evacuation of the working media from within the rotary union. In the contemplated application, leakage of the working media is undesired both at the beginning and at the end of the work task.

With the foregoing in mind, an air flow is applied to the air actuation port at 302, which operates to engage the rotary seal in the absence of working media as previously discussed. At this stage, the air flow causes a piston-like feature of the union to impart a force tending to extend the non-rotating seal member relative to the housing. When the seal has engaged, the air flow may be optionally discontinued at 304, which in one embodiment occurs at the same time or shortly follows initiation of the media flow in the media channel at 306. It should be appreciated that for those rotary union embodiments that include an opening spring, discontinuation of the air flow in the absence of working media may cause the seal to disengage and, thus, for those embodiments, process step 304 may be omitted. For those embodiments that do not include an opening spring, discontinuation of the air flow may not cause the seal to disengage if static forces, such as friction, and closing forces, such as springs, etc., can overcome any opening forces such that seal engagement may be maintained.

With the rotary seal engaged, a flow of working media may be initiated at 306. Closure of the seal prior to initiation of working media flow may be desirable for various reasons. For example, even though incompressible working media will cause seal engagement based on the balance ratio of the rotary union, insufficient hydraulic forces during a limited period of flow initiation within the media channel may permit fluid leakage unless the seals are already engaged. By first providing the air flow to engage the seal at 302, one may ensure against such undesirable fluid leakage.

When the work task is complete, an air flow may be applied to the air actuation port at 308. Ordinarily, the force tending to engage the seals may not be compounded with a hydraulic force from the working media to reduce seal wear. Here, the application of the air flow is for a limited time while the working fluid flow and pressure are reduced so that the seal may remain in an engaged condition. Optionally, a vacuum may be applied to the media channel to remove any remaining working fluid at 310, while the air flow is still applied to maintain the seal in an engaged condition. In this way, effective evacuation of the media channel can be achieved and fluid leakage can be avoided.

When evacuation of the working fluid is complete, the air flow to the air actuation port is discontinued and may optionally be replaced by the application of a vacuum at that same port at 312. As previously described, application of vacuum to the air actuation port may cause the disengagement of the seal members. Again, it should be appreciated that this process step may not be required if an opening spring, such as that shown in the embodiment of FIG. 4, is used. Alternatively, disengagement of the seal members can be accomplished by axial motion of the rotating seal member.

In operation, the rotary union 100 may use an air flow or a liquid coolant flow provided at about 0 bar to the piston volume 214 (FIG. 3 or 4) such that the seal members 102 and 104 can be engaged. To disengage the seals, a vacuum of between 3 and 6 bar may be used. The magnitude of these parameters may change depending on the particular dimensions that are selected for the structures that facilitate the engagement or disengagement of the seals.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A rotary union for providing a fluid connection between a rotating machine component and a non-rotating machine component, comprising:
   a rotating seal carrier adapted for connection to the rotating machine component, the rotating seal carrier having a rotating seal member connected thereon;
   a non-rotating seal carrier having a generally cylindrical shape, the non-rotating seal carrier having a non-rotating seal member connected thereon;
   a piston portion connected to an end of the non-rotating seal carrier proximate the non-rotating seal member, the piston portion having a generally cylindrical shape with an enlarged diameter relative to the non-rotating seal carrier;
   a flow restrictor ring having a generally annular shape disposed around the piston portion;
   a housing connected to the non-rotating machine component and forming a carrier bore into which the non-rotating seal carrier is slidably and sealably disposed such that, when the non-rotating seal carrier is at an extended position relative to the housing, the non-rotating seal engages the rotating seal to form a sliding face seal, the housing further forming a piston bore that slidably accepts therewithin the piston portion and the flow restrictor ring such that a gap is formed in a radial direction between an outer diameter of the flow restrictor ring and an inner diameter of the piston bore;
   a segmented media channel formed in the rotating and non-rotating seal carriers, the segmented media channel being adapted to define a fluid passageway that conveys fluid media between the rotating and non-rotating machine components while the sliding face seal is present, wherein the segmented media channel is further adapted to be open for venting to the atmosphere when the rotating and non-rotating seal members are not engaged;
   wherein the enlarged diameter of the piston portion provides a net pneumatic or hydraulic surface that can be acted upon by a fluid at a positive or negative atmospheric pressure present within the piston bore of the housing.

2. The rotary union of claim 1, wherein the segmented media channel is configured to operate under a positive pressure or a vacuum when conveying media between the rotating and non-rotating machine components.

3. The rotary union of claim 1, further comprising a secondary seal disposed between the carrier bore of the housing and the non-rotating seal carrier, the secondary seal providing a sliding seal between an inner surface of the carrier bore and an outer surface of the non-rotating seal carrier, the sliding seal separating fluids at different pressures present within the segmented media channel and the piston bore.

4. The rotary union of claim 3, wherein the secondary seal is axially located between the piston bore and an inlet opening of the segmented media channel disposed within the housing.

5. The rotary union of claim 3, wherein the secondary seal is selected from the group consisting of a U-cup seal, an O-ring seal, and a lip seal.

6. The rotary union of claim 1, further comprising an actuation passage formed in the housing and fluidly interconnecting the piston bore with an air actuation port formed in the housing and connected to selectively configured source or sink of fluid pressure.

7. The rotary union of claim 6, wherein, when an air flow is provided to the air actuation port, a flow momentum of the air flow entering the piston bore through the air actuation passage is configured to fill the piston bore, leak at a predetermined rate through the radial gap past the flow restrictor ring, and dynamically push against a back side of the piston portion and the restrictor ring to, in part, urge the non-rotating seal carrier to move in an extending direction relative to the housing.

8. The rotary union of claim 6, wherein, when the air actuation port is subjected to a vacuum, a flow momentum of the air flow entering the piston bore from the environment is configured to leak at a predetermined rate through the radial gap past the flow restrictor ring, and dynamically push a front side of the piston portion and the restrictor ring to, in part, urge the non-rotating seal carrier to move in a retracting direction relative to the housing.

9. The rotary union of claim 1, further comprising a resilient element disposed between the non-rotating seal carrier and the housing, the resilient element being disposed to provide a resilient force in a direction urging the non-rotating seal carrier in a retracting direction relative to the housing.

10. The rotary union of claim 9, wherein the resilient force is configured such the force provided by the resilient element is sufficient to overcome a weight of the non-rotating seal carrier and non-rotating seal member when the rotary union is installed in a position in which a centerline of the carrier bore is at an angle other than horizontal.

11. The rotary union of claim 1, wherein the restrictor ring is made of a material that is formable in desired dimensions, has a relatively low friction when interfacing with the walls of the piston bore, and is generally self-lubricating when air is used as an actuating fluid relative to the piston portion.

12. The rotary union of claim 1, wherein the carrier bore and the piston bore are formed as a stepped bore within the housing, and wherein the carrier bore has a clearance relative to the non-rotating seal carrier, the clearance permitting for angular mis-alignment in an axial direction between the non-rotating seal carrier and the carrier bore such that operational or assembly misalignment conditions between the rotating and non-rotating machine components can be accommodated.

13. A rotary union for use in a machine including rotating and non-rotating components, the rotary union disposed to fluidly connect a segmented media channel extending between the non-rotating and the rotating machine components, the rotary union comprising:

a rotating seal carrier that is connectable to the rotating machine component, the rotating seal carrier having a rotating seal member connected thereon;

a non-rotating seal carrier that is connectable to the non-rotating machine component, the non-rotating seal carrier having a non-rotating seal member connected thereon;

a piston portion formed on an end of the non-rotating seal carrier proximate the non-rotating machine component, the piston portion having a generally cylindrical shape with an enlarged outer dimension relative to the non-rotating seal carrier;

a housing forming a carrier bore into which the non-rotating seal carrier is slidably and sealably disposed such that, when the non-rotating seal carrier is at an extended position relative to the housing, the non-rotating seal engages the rotating seal to form a sliding face seal, the housing further forming a piston bore that slidably accepts therewithin the piston portion such that a gap is formed in a radial direction between an outer diameter of the piston portion and an inner diameter of the piston bore;

a segmented media channel formed in the rotating and non-rotating seal carriers, the segmented media channel being adapted to define a fluid passageway that conveys fluid media between the rotating and non-rotating machine components while the sliding face seal is present, wherein the segmented media channel is further adapted to be open for venting to the atmosphere when the rotating and non-rotating seal members are not engaged;

wherein the enlarged outer dimension of the piston portion provides a net pneumatic or hydraulic surface that can be acted upon by a fluid at a positive or negative atmospheric pressure present within the piston bore of the housing; and wherein, when a fluid at a positive gage pressure is provided to the piston bore, a fluid flow momentum entering the piston bore fills the piston bore, leaks at a predetermined rate through the radial gap past the piston portion, and dynamically pushes against a back side of the piston portion, thus causing the non-rotating seal carrier to move in an extending direction relative to the housing.

14. The rotary union of claim 13, further comprising a flow restrictor ring having a generally annular shape disposed around the piston portion, wherein the gap is provided between an outer portion of the restrictor ring and an inner surface of the piston bore.

15. A rotary union for use in a machine including rotating and non-rotating components, the rotary union disposed to fluidly connect a segmented media channel extending between the non-rotating and the rotating machine components, the rotary union comprising:

a rotating seal carrier that is connectable to the rotating machine component, the rotating seal carrier having a rotating seal member connected thereon;

a non-rotating seal carrier that is connectable to the non-rotating machine component, the non-rotating seal carrier having a non-rotating seal member connected thereon;

a piston portion formed on an end of the non-rotating seal carrier proximate the non-rotating machine component, the piston portion having a generally cylindrical shape with an enlarged outer dimension relative to the non-rotating seal carrier;

a housing forming a carrier bore into which the non-rotating seal carrier is slidably and sealably disposed such that, when the non-rotating seal carrier is at an extended position relative to the housing, the non-rotating seal engages the rotating seal to form a sliding face seal, the housing further forming a piston bore that slidably accepts therewithin the piston portion such that a gap is formed in a radial direction between an outer diameter of the piston portion and an inner diameter of the piston bore;

a segmented media channel formed in the rotating and non-rotating seal carriers, the segmented media channel being adapted to define a fluid passageway that conveys fluid media between the rotating and non-rotating machine components while the sliding face seal is present, wherein the segmented media channel is further adapted to be open for venting to the atmosphere when the rotating and non-rotating seal members are not engaged;

wherein the enlarged outer dimension of the piston portion provides a net pneumatic or hydraulic surface that can be acted upon by a fluid at a positive or negative atmospheric pressure present within the piston bore of the housing; and wherein, when a negative gauge pressure is induced in the piston bore, a flow momentum of an air flow entering the piston bore from the environment is configured to leak at a predetermined rate through the radial gap and dynamically push a front side of the piston portion, thus causing the non-rotating seal carrier to move in a retracting direction relative to the housing.

16. A machine having a rotating component and a non-rotating component that form a rotary union as set forth in claim 13.

17. The rotary union of claim 15, further comprising a flow restrictor ring having a generally annular shape disposed around the piston portion, wherein the gap is provided between an outer portion of the restrictor ring and an inner surface of the piston bore.

* * * * *